Figure 1:
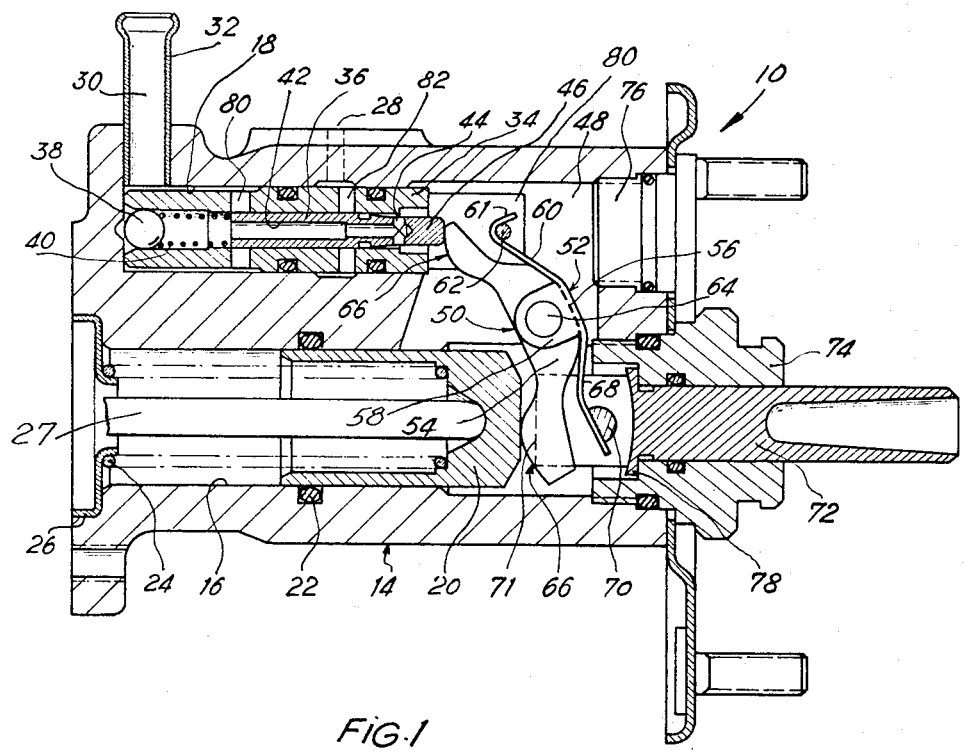

United States Patent [19]

Carre

[11] 3,805,671
[45] Apr. 23, 1974

[54] HYDRAULIC POWER CONTROL DEVICE
[75] Inventor: Jean Jacques Carre, Montreuil, France
[73] Assignee: Societe Anonyme D.B.A., Paris, France
[22] Filed: Dec. 7, 1972
[21] Appl. No.: 313,000

[30] Foreign Application Priority Data
Dec. 24, 1971 France .............................. 71.46522

[52] U.S. Cl. ................................ 91/391 R, 303/54
[51] Int. Cl. ............................................. F15b 13/14
[58] Field of Search ........ 303/54, 52, 50; 91/391 R, 91/434, 469; 60/54.6 P; 188/359; 74/110, 108, 100, 470

[56] References Cited
UNITED STATES PATENTS
3,677,140  7/1972  Brown ................................ 91/434
2,204,530  6/1940  Eaton .................................. 303/54
3,603,209  9/1971  MacDuff et al. ................ 91/391 R FOREIGN PATENTS OR APPLICATIONS
1,105,351  2/1966  Great Britain ...................... 91/391

Primary Examiner—Duane A. Reger
Assistant Examiner—D. C. Butler
Attorney, Agent, or Firm—Ken C. Decker; William N. Antonis

[57] ABSTRACT

The invention relates to a hydraulic power control device notably for a vehicle powered braking system, having yielding lever means. The lever means comprise an arm pivotally mounted on a first axle secured to the device housing, and a feeler member pivotally mounted on a second axle, said second axle being pivotally mounted on the arm, the ends of the feeler member cooperating with a spool valve and a servomotor piston respectively, the connection between the arm and the housing being yieldable in case of excessive stresses applied on a push rod engaging the free end of the arm.

7 Claims, 2 Drawing Figures

HYDRAULIC POWER CONTROL DEVICE

The invention relates to a hydraulic power control device notably for controlling a vehicle braking system.

It concerns more particularly a hydraulic control device giving a reaction fuel and permitting a direct mechanical transmission for moving the servomotor piston upon failure of the pressure source.

There has already been proposed a hydraulic power control device, notably for controlling the master cylinder of a brake system comprising in a casing a servomotor having a piston, the displacements of which are subordinated to the pressure controlled in a working chamber by a servo-valve disposed between a high pressure fluid source and a fluid reservoir, the movements of said servo-valve in a bore substantially parallel to the displacements of said servo motor piston being controlled by lever means adapted to be actuated by said piston, and by a slidable control rod, said lever means comprising a feeler member connecting said servo-valve with said piston, said feeler member being tiltable about a movable pivot located on an arm, one end of which is pivotably secured to said housing, the other end of which being operatively connected to said control rod.

In such a hydraulic control device, the lever means pivotably secured to the housing through the intermediary of a fixed connection are adapted to collapse, upon lost of control pressure, for obtaining an abutting engagement between the control rod and the piston, thereby avoiding any heavy stress in the lever means during the unpowered actuation of the brakes.

Although the control device operates satisfactorily, it may happen that the servo-valve is jammed in its bore due by way of example to contamination. Thus, since each part of the lever means is rigid and the fixed location of the connection between the arm and the housing, it results therefrom, during unpowered actuation of the brakes, substantial stresses may be generated in the lever means that may damage them.

With a view to avoiding this drawback, the invention proposes a control device as hereinabove recited further characterized in that the arm is pivotably secured to said housing through a yielding connection.

According to a preferred embodiment of the invention, the said one end of the arm comprises a resilient portion. Thanks to this feature, the mechanical linkage between the housing, the movable pivot and the point of contact between the jammed servo-valve and the co-operating therewith end of the feeler member is resiliently deformable.

Still according to a further embodiment of the invention, the feeler member comprises shaped cam means located on either side of said movable pivot, resilient means being provided to urge said piston and said servo-valve respectively in abutment against said cam means, and said axially moving rod member comprises an abutment limiting the return stroke of said rod, said other end of the arm including a resilient portion outwardly urging said control rod towards said abutment, thereby biasing the said one end of said arm in abutting engagement with said axis secured to the housing. Thanks to this feature, as it will be explained below, the mounting operations of the control device are substantially improved.

Figure 2:
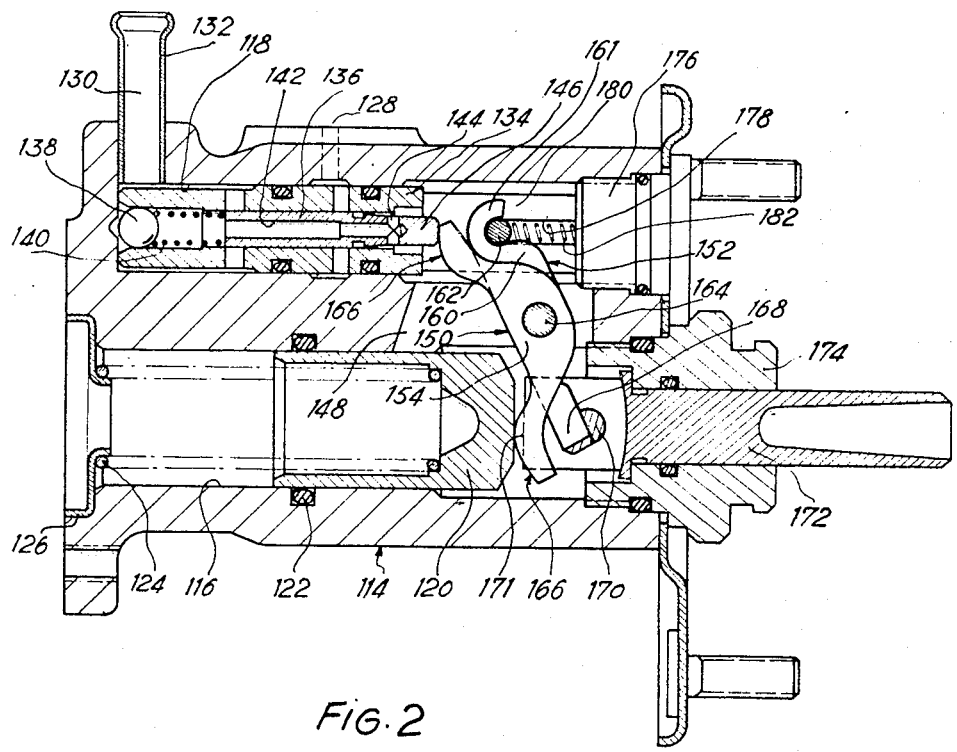

The invention will now be described by way of example with reference to the accompanying drawings in which:

FIG. 1 is a longitudinal cross-section view of a hydraulic power control device according to an embodiment of the invention, and FIG. 2 is a longitudinal cross-sectional view of a hydraulic power control device according to another embodiment of the invention.

The hydraulic power control device of FIG. 1 has been generally designated by the reference 10. It comprises a casing 14 having two bores 16 and 18 which in the shown embodiment are parallel one with the other. When considering FIG. 1, a well-known master-cylinder (not shown) is fitted to casing 14 at the left side thereof, coaxially with respect to bore 16. The master cylinder is adapted to actuate a set of wheel brakes of a vehicle upon an usual manner. A servomotor piston 20 is slidably mounted in bore 16. A sealing engagement is provided between piston 20 and bore 16 by means of an annular seal 22. Piston 20 is urged toward the right by a return spring 24 taking support upon the abutment washer 26. A rod (27) is provided to transmit to the master cylinder input piston the force exerted by the piston 20 upon shifting of the latter.

Bore 18 comprises a lateral orifice 28 (shown in dotted lines) communicating with a pressure source, an accumulator (not shown). The bore 18 also includes another lateral orifice 30 communicating through fitting 32 to a reservoir of hydraulic fluid (not shown). A sleeve 34 is mounted in the bore 18 and slidably receives a sliding spool valve 36. One end of sleeve 34 is closed by a sealing ball 38 which supports spring 40 which urges the spool 36 towards the right, viewing FIG. 1. Spool 36 is provided with a stepped bore 42 whose front end is open but whose rear end is connected by radial passages 44 to a sealed cavity 48 provided in casing 14. The rear end of the spool 36 comprises a smaller diameter portion 46.

Bores 16 and 18 open at their rear ends into a cavity of chamber 48 in which is confined lever means 50. The means comprise two parts, a bow-shaped arm 52 and a feeler member 54. The arm 52 comprises a central portion 56 with a pair of lugs 58 connected thereto. When considering FIG. 1, the upper end 60 of the arm presents a resilient portion and is terminated by a hook 61 cooperating with an axle 62 supported by the wall of the housing 14. The axle 62 also extends through the portion 82 of the sleeve 34 to secure the latter. On the other hand, the lower end 68 of arm 52 presents a resilient portion abutting a projection 70 provided on the forked head 71 of an input control rod 72 connected to an usual brake pedal (not shown). The control rod 72 is slidably mounted in a plug 74 secured to casing 14, and is adapted to move substantially parallel to the bore 16, and to eventually engage the piston 20, as will be more fully described hereinafter.

The feeler member 54 is located between lugs 58 and connected to arm 52 by a movable pivot 64. Feeler member 54 comprises at both ends, cam forming surfaces 66 of generally cylindrical shape, in the present example, said cam surfaces being adapted to engage the adjacent surfaces of the respective ends of spool 36 and piston 20.

It should be pointed out that the mounting operations of the device are notably facilitated. A removable cap 76 covers an opening provided in the end of the bore 18. Therefore, it is possible to install the sleeve 34, ball 38, spring 46, and spool 36, and axle 62 in the housing 14 before closing the opening with the cap 76. Assuming that the lever means are pre-assembled, they are introduced in chamber 48, thereby the hook 61 of the arm 52 engages the axle 62. Control rod 72 and plug 74 are secured to the housing thereby the feeler member 54 is free to rotate in the central spline of the forked head 71 of rod 72, and the resiliency of the lower end 68 normally urges a flange 78 of head 71 in abutment against a fixed shoulder provided on plug 74. Finally, piston 20, spring 24 and washer 26 are mounted in bore 16, such as by the connecting rod (not shown) and the end of the attached master cylinder.

Assuming the master cylinder input piston is in its rest position, springs 40 and 24 urge the feeler member and the control device parts in their rest positions as shown.

As shown on FIG. 1, the forward end of the balanced spool 36 exactly covers an aperture 80 provided in sleeve 34, and communicating with passage 30, whereas the rear end of the spool 36 exactly covers another aperture 82 provided in sleeve 34 and communicating with passage 28. Thus, in this rest position of the control device, the working chamber 48 is insulated from either the pressure source or the fluid reservoir.

On the other hand, since the movable pivot 64 is urged in its far-right position with respect to FIG. 1 the resilient portions of the arm 52 are stressed, thereby urging the control rod 72 in engagement with the plug 74, and the hook 61 in engagement with the axle 62. Obviously, since during operation the rod 72 is moved to the left of FIG. 1, there is no risk for the hook 61 to disengage the axle 62.

In operation, when the rod 72 is pushed toward the interior of the control device body, arm 52 is rotated clockwise resulting in displacement of pivot 64 of feeler member 54. Cam surfaces 66 of said feeler member are thus urged against the adjacent surfaces of spool 36 and piston 20 respectively.

Since the strength of spring 24 of piston 20 is higher than that of spring 40 of spool 36, feeler member 54 takes support upon the end of piston 20 and is thus counterclockwise pivoted upon the latter further to the displacement of the pivot 64. Spool 36 is thus moved in the bore of the sleeve 34 until the smaller portion 46 of spool 36 is set in communication with orifice 82. At this moment, the liquid under pressure from the accumulator flows into cavity 48 thus causing the displacement of piston 20 against spring 24 thereof and, consequently, through the connecting rod, actuates the master-cylinder. Simultaneously, the pressure in cavity 48 exerts upon push-rod 72 a hydraulic thrust which constitutes the reaction feel transmitted to the pedal. When the reaction force becomes equal to the thrust force exerted upon the rod 72 the latter stops. Arm lever 52 and pivot 64 stop moving. Feeler member 54 which is maintained by spring 40 through spool valve 36 in abutment against the piston 20 submitted to the pressure in the control chamber 48 is pivoted clockwise about its pivot 64 to bring spool 36 in its neutral position for which chamber 48 isolated both from accumulator and the reservoir of hydraulic fluid. The piston 20 is therefore balanced and is maintained at a constant distance from the push-rod 72. Any displacement of the piston from this position will induce a corresponding movement of the spool 36, which will urge the piston back to its balanced position. Any complementary force applied to push-rod 72 will cause a further displacement of the latter and a corresponding displacement of the piston 20 until said force has been compensated by the force exerted by the complementary pressure admitted into chamber 48, in which case a new balanced state will be reached.

Upon release of the force exerted on the brake pedal, the push rod 72 is caused by the pressure in chamber 48 to move toward the exterior of the body, toward the right as viewed on FIG. 1. A flange 78 is provided on the head of push-rod 72 to constitute an abutment for the latter, said abutment defining the position of the push rod for which the piston of the master cylinder is in its released position.

During the return stroke of the push-rod 72, bringing the flance thereof in abutment against plug 74, lever 52 is counterclockwise tilted about its axle 62 thus causing the movement of the pivoting pivot 64 of feeler member 52. The feeler member is thus brought rearwardly thus permitting spool 36 to move toward the right under the action of its spring 40. It is to be noted that the return movement of the feeler member is accompanied by the clockwise rotation thereof about axle 62, said rotation being caused by the increase of the relative distance between the push rod and the piston. The displacement of spool 36 under the action of spring 40 causes the communication between chamber 48 and the reservoir to be established through the orifice 30 thus permitting piston 20 to move under action of spring 24 until a position corresponding to the abutment of piston 20 on the abutment washer 22 is reached. It will be noted that such position of piston 20 is also a balanced position as defined hereinabove. Thus it not necessary to provide a rear abutment for the piston.

During application of braking pressure, any failure of the liquid pressure supply from the accumulator into the cavity 48 will result in piston 20 remaining in its released position as shown in the figure. As a result, the continued inward movement of the rod 72 will eventually engage the forked head 71 (shown in dotted line) with the end of piston 20 whereby the latter will be subsequently moved directly by the push-rod 72 to apply the brakes.

Assuming first that the spool 36 is free to move, during the inward movement of the push rod, the spool 36 is urged to the left of the figure against the strength of spring 40, and the feeler 54 is free to rotate to insure the direct engagement between piston 20 and push-rod 72.

In the event that the spool 36 is jammed in its bore, the resilient portion of end 60 of the arm 52 is bent. This feature is important since without a yielding connection between arm 52 and the axle 62, there is no possibility of deformation of triangle defined by axle 62, pivot 64 and the point of contact between the spool head 46 and the feeler cam surface 66. In the event of no possibility of deformation, heavy stresses are developed in the lever means, inducing a substantial reaction force on the spool 36. It may result therefrom damages in the lever means, or a sudden freeing of the spool which causes an abrupt stopping of the vehicle.

The embodiment illustrated in FIG. 2 is similar to the embodiment illustrated in FIG. 1 and will not be described in detail. Consequently, elements in FIG. 2 which are substantially the same as like elements in FIG. 1 retain the same reference character, but are increased by 100.

The difference between the two embodiments of the invention consists in that the arm 152 is pivotably secured to a movable element or axle 162 slidably mounted in said casing. Opposite ends of the axle 162 are slidably mounted in splines 178 provided in the portion 180 of the sleeve 134. Splines 178 extend parallel to the axis of the bore 118. A spring 182 yieldably urges axle 162 toward a stop (not shown) at the left end of the splines 178 (viewing FIG. 2), to thereby define the rest or normal position of the axle 162. The sleeve 134 is mounted between the bottom of the valve bore and the plug 176.

The arm 152 consist of two parallel extending plates secured together by ends 168, and having hooks 161 at ends 160. It should be noted that assuming that the spool 136 is jammed in sleeve 134, the axle 162 is adapted to slide in spline 178 towards the plug 176 in to opposite direction of the displacement of the control rod 172.

The embodiment of FIG. 2 may be further modified by changing the position of the pivot 164 so that the length of that portion of the arm 152 between the pivot 164 and the pivot 162 is greater than the length of that portion of the arm 152 between the pivot 164 and the projection 170. Consequently, the pedal ratio, which is defined as the ratio between the stroke of the piston 120 to the stroke of the control rod 172, is greater than unity during powered actuation of the booster. However, if communication of pressurized fluid into the booster should fail, spring 182 yields to permit rod 172 to engage the piston 120, so that the pedal ratio will then be equal to unity.

What we claim is:

1. A hydraulic power control device comprising:
a housing defining a chamber therewithin;
a pair of bores communicating with said chamber;
a piston slidable in one of said bores;
a valve slidably mounted in the other bore for controlling fluid communication between a pressure source and said chamber for shifting said piston;
an operator-operated control rod for operating said valve, said control rod projecting into said chamber and adapted to engage said piston upon failure of said pressure source;
mechanism operably connecting the control rod, the piston and the valve for opening the latter upon operation of the control rod, said mechanism including lever means, one end of said lever means being operably connected to said valve, the other end of said lever means being operably connected to said piston, and yieldable means connecting the lever means to the housing, said yieldable means including a deflectable arm, first pivot means connecting the arm to the lever means, second pivot means connecting one end of said arm to the housing, the other end of said arm being operably connected to said control rod, said arm deflecting with respect to the housing to prevent damage to said mechanism when said valve jams and the control rod is operated.

2. The invention of claim 1:
said second pivot means including a pin secured to said housing, said one end of said arm terminating in a hook engaging said pin.

3. The invention of claim 1:
the portion of said arm between said first and second pivots being resilient.

4. The invention of claim 3:
the portion of said arm between said first pivot and the other end of said arm being resilient.

5. The invention of claim 4:
said arm consisting of a bow-shaped resilient element.

6. The invention of claim 1:
said second pivot including a pivoting member, means in said housing for slidably mounting said pivoting member for movement in a direction substantially parallel to the axis of the other bore, stop means for limiting sliding movement of the pivoting member, resilient means yieldably urging said pivoting member toward the stop means, and means on said one end of the arm for engaging the pivoting member.

7. The invention of claim 6:
said means for slidably mounting said pivoting member being parallel splines provided in said housing;

said pivoting member being a pin, opposite ends of said pin being mounted in corresponding slides.

* * * * *